J. SCHRODER.
Wheel Cultivator.

No. 69,255.                                    Patented Sept. 24, 1867.

Witnesses:                                     Inventor:
Theo Tusche                                    John Schroder
Wm Truvin                                      Per Hummel &
                                               Attys

United States Patent Office.

JOHN SCHRÖDER, OF KICKAPOO, ILLINOIS.

Letters Patent No. 69,255, dated September 24, 1867.

IMPROVEMENT IN CULTIVATORS.

The Schedule referred to in these Letters Patent and making part of the same.

TO ALL WHOM IT MAY CONCERN:

Be it known that I, JOHN SCHRÖDER, of Kickapoo, in the county of Peoria, and State of Illinois, have invented a new and useful Improvement in Cultivators; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

This invention relates to a new device for regulating the draught of the horses, and for equalizing the same; also for making the plough-beams flexible, so that they can be turned in every direction.

The invention consists in arranging a frame which rests upon small wheels, and upon which the pole or tongue is immovably fixed. To the under side of the tongue is pivoted a cross-beam, so that it can turn on its pivot. The plough-beams, which consist each of two pieces, that are connected by vertical pins, are, by means of horizontal pins, pivoted to bars or plates projecting from the under side of the aforesaid cross-beam. The horses are hitched to triangular braces that are hinged to the front of the cross-beam, so that the draught-attachment and the plough-beams are all connected by flexible joints, and each horse will draw its own plough on a single-tree, although the draught will be equalized as if the horses were hitched to a double-tree.

Figure 1:
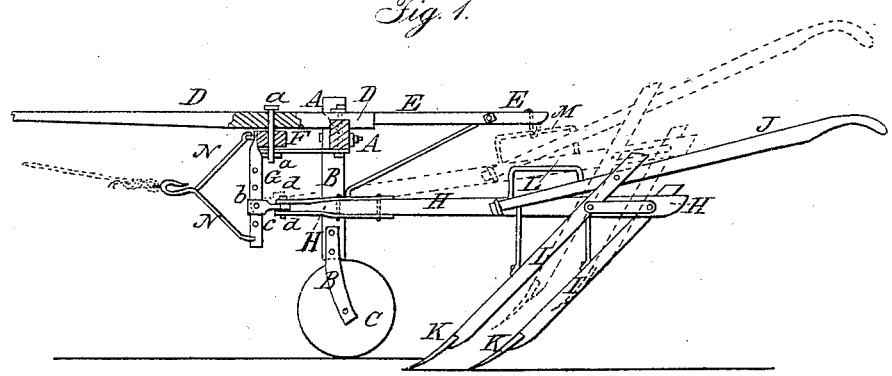
Figure 1 represents a longitudinal vertical section of my improved cultivator.
Figure 2:
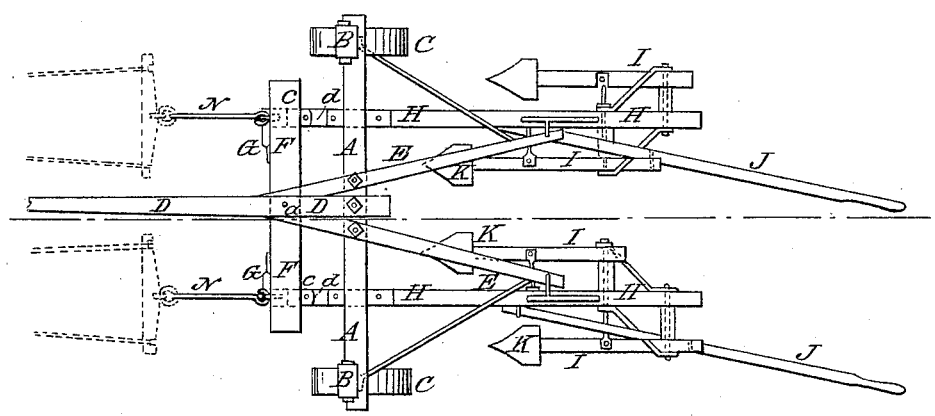
Figure 2 is a plan or top view of the same.

A represents a horizontal bar, fitted upon the upper ends of two uprights, B, that rest upon small wheels C. The tongue D is secured upon the bar A by means of a bolt or bolts, and is steadied by braces E, as is clearly shown in the drawing. F is a cross-bar, which is by a pin, $a$, pivoted to the under or upper side of the tongue D. From its ends, or nearly from the same, are suspended plates or pendants G, to which the front ends of the plough-beams H are pivoted by means of pins $b$, said bars G being perforated so as to allow the height of the plough-beams to be adjusted as shown. The front portion of each plough-beam is made of two pieces, the short front or coupling-piece $c$ being pivoted by a vertical pin, $d$, to the front pieces of the plough-beam. The latter can thus swing up and down, around the pin $b$, and to either side on the pin $d$, as shown. The plough-standards I I and the handles J are fitted to the plough-beams in the usual or any suitable manner. The ploughshares K may be of suitable shape and construction, according to the work to be done. On each plough-beam is a staple L, by means of which the beam can be raised, and its rear end be suspended from a hook, M, formed on projections from the frame A, or on the rear ends of the braces E, as shown by red lines in fig. 1. The draught-attachment consists of two converging bars, N, hinged with their outer ends to the pendants G or to the cross-bar F, or some downward projection from the same, as shown. On their connection or front end is formed a hook to which the whiffle-tree is secured. One such draught-attachment is formed near each end of the bar F, nearly in front of and in line with each plough-beam, and the connections are such that perfect regularity and adjustment of power will be attained.

I claim as new, and desire to secure by Letters Patent—

1. The manner, herein shown and described of securing the plough-beams to the frame A by means of pendants G and a movable cross-bar, F, the latter being pivoted to the tongue D, substantially as set forth.

2. The above, in combination with the swinging draught-bars N, made as described.

JOHN SCHRÖDER.

Witnesses:
JACOB BEST,
PETER BLUMLY.